United States Patent [19]

Castellano et al.

[11] Patent Number: 5,139,766
[45] Date of Patent: * Aug. 18, 1992

[54] PROCESS FOR PREPARING MIXED ZIRCONIUM AND YTTRIUM OXIDE POWDERS

[75] Inventors: Maurizio Castellano, Turin; Thomas P. Lockhart; Armando Marcotullio, both of San Donato Milanese, all of Italy

[73] Assignee: Eniricerche S.p.A., Milan, Italy

[ * ] Notice: The portion of the term of this patent subsequent to Jun. 2, 2009 has been disclaimed.

[21] Appl. No.: 658,553

[22] Filed: Feb. 21, 1991

[30] Foreign Application Priority Data

Feb. 23, 1990 [IT] Italy ................. 19473 A/90

[51] Int. Cl.$^5$ .............................................. C04B 35/48
[52] U.S. Cl. ........................... 423/608; 423/266; 423/593; 501/103
[58] Field of Search ............. 423/266, 593, 608; 501/103

[56] References Cited

U.S. PATENT DOCUMENTS

| | | | |
|---|---|---|---|
| 4,501,818 | 2/1985 | Rossi | 423/608 |
| 4,627,966 | 12/1986 | Micheli | 423/608 |
| 4,664,894 | 5/1987 | Suzuki et al. | 423/608 |
| 4,719,091 | 1/1988 | Wusirika | 423/608 |

FOREIGN PATENT DOCUMENTS

| | | | |
|---|---|---|---|
| 56-145118 | 11/1981 | Japan | 501/103 |
| 62-132708 | 6/1987 | Japan | 501/103 |

*Primary Examiner*—William R. Dixon, Jr.
*Assistant Examiner*—Anthony J. Green
*Attorney, Agent, or Firm*—Shea & Gould

[57] ABSTRACT

Mixed zirconium and yttrium oxides ($ZrO_2(Y_2O_3)$) with a yttrium content (evaluated as metal) from about 15 to about 21% by weight, as powders in cubic crystal form, are prepared by:

mixing an aqueous solution of zirconium and yttrium carboxylates with an organic solvent in the form of a nitrile or alcohol;

from said mixture, precipitating solid particles of the precursors of mixed zirconium and yttrium oxides by operating at a pH between 5 and 7 and at ambient or close to ambient temperature; and calcining said precipitated solid particles at high temperature to directly transform them from the amorphous state to the cubic crystal form.

The mixed zirconium and yttrium oxides obtained in this manner are suitable for use in the ceramics sector.

10 Claims, No Drawings

PROCESS FOR PREPARING MIXED ZIRCONIUM AND YTTRIUM OXIDE POWDERS

This invention relates to a process for preparing mixed zirconium and yttrium oxide powders suitable for use in the ceramics sector. Various mixed metal oxides are used in the ceramics sector. One example of these is zirconium dioxide ($ZrO_2$) stabilized in one of two crystal phases by incorporated yttrium oxide ($Y_2O_3$), the phase depending on the quantity of the latter. In particular, it is known that in the mixed oxide, a level of about 4 mol % of yttrium oxide stabilizes the tetragonal phase of zirconium dioxide, which demonstrates excellent mechanical stability, whereas a level exceeding 8 mol % stabilizes the cubic form.

In the known art, metal oxides in powder form can be obtained by precipitation from homogeneous solutions of inorganic metal salts, as described for example by E. Matijevic, Acc. Chem. Res. (1981), 14, 22, in U.S. Pat. No. 4,649,037, and in Japanese patent application 59-069.471. Another known path is based on sol/gel reactions by organometallic precursors, as described for example by P. Colomban in L' Industrie Ceramique (1985), 792, 186. A further path is based on reactions involving precipitation from emulsions, as described by A. B. Hardy in "Precipitation of Submicrometer Unagglomerated Oxide Particles by Reaction of Emulsion Droplets", Ph. D. Thesis, Massachusetts Institute of Technology, Cambridge, Mass. (1988); M. Akins in "Precipitation of Fine Oxide Powders by Emulsion Precipitation", Ph.D. Thesis, Iowa State University, Des Moins, Iowa (1987); and G. Gowda et al. in "Ceramic Powder from Sol-Emulsion-Gel Techniques", Final Project Report (R10), Am. Cer. Soc. Basic Science: Electronics and Glass Divisions Joint Meeting, New Orleans (La.), November 1986.

These approaches of the known art have, however not proven satisfactory, especially in view of the complexity of the procedures and the use of costly reagents such as metal alkoxides. A simple and convenient process has now been found which enables mixed zirconium and yttrium oxides to be obtained as a powder in cubic crystal form from low cost reagents.

In accordance therewith, the present invention provides a process for preparing mixed zirconium and yttrium oxides ($ZrO_2(Y_2O_3)$), with a yttrium content, evaluated as metal, of from about 15 to about 21% by weight, as powders in cubic crystal form, characterised by:
- mixing an aqueous solution of zirconium and yttrium carboxylates with an organic solvent chosen from aliphatic nitriles containing between 1 and 3 carbon atoms in the alkyl portion and aliphatic alcohols containing between 8 and 11 carbon atoms in the molecule;
- from said mixture, precipitating solid particles of the precursors of mixed zirconium and yttrium oxides, by operating at a pH between 5 and 7 and at ambient or close to ambient temperature; and
- calcining said precipitated solid particles at high temperature to directly transform them from the amorphous state to the cubic crystal form.

Suitable yttrium and zirconium carboxylates for this purpose are the salts of lower aliphatic carboxylic acids, and especially zirconium and yttrium acetates. The preferred organic solvents are chosen from acetonitrile and n-octanol. When an aliphatic alcohol containing between 8 and 11 carbon atoms in the molecule is used as the organic solvent, a water-in-oil emulsion is obtained. When an aliphatic nitrile containing between 1 and 3 carbon atoms in the alkyl portion is used for this purpose, a single-phase system is obtained.

Preferably the single or two-phase mixture contains between 70 and 90% by weight of organic solvent and between 8 and 30% by weight of water. In addition, the aqueous phase contains preferably between 5 and 10% by weight of yttrium and zirconium carboxylates in a molar ratio of between 0.6/1 and 2/1 and preferably between 0.8/1 and 1.3/1. The precipitation takes place by maintaining the mass under stirring and by operating at a pH of between 5 and 7. If necessary or convenient, the pH of the aqueous zirconium and yttrium carboxylate solution can be corrected by adding a small quantity of an organic or inorganic base. Bases suitable for this purpose include alkaline metal hydroxides such as sodium hydroxide, ammonia and aliphatic amines such as butylamine. The added base quantity varies conveniently from 0 to $6 \times 10^{-3}$ moles per 1000 g of mixture in the case of alkaline metal hydroxides and from 0 to 0.4 moles per 1000 g of mixture in the case of ammonia and aliphatic amines.

In the practical implementation of the process of the present invention, the alcoholic or nitrile solvent can be mixed with an aqueous solution of the base, if used, and then adding an aqueous zirconium and yttrium carboxylate solution.

In all cases, operating under the aforesaid conditions, under stirring at a temperature of between about 18° and about 25° C., a precipitate of the precursors of the mixed oxides forms as an amorphous powder within a short time normally of the order of 1–60 minutes.

When precipitation is complete, the powder is separated from the mixture by normal means such as filtration or centrifuging, is washed with alcohol, for example with 95% ethanol, and then with double distilled water, and finally is dried. The dried powder is finally calcined at a high temperature, typically between about 900° and 1400° C., for a time of the order of 1–10 hours. Under these conditions, direct transformation into the cubic structure of zirconium dioxide stabilized with yttrium oxide takes place. The quantity of yttrium, evaluated as metal in the calcined product can reach a value of 21% by weight and is typically within the range of about 10% to about 21% by weight. The calcined powder particles have a size of between about 0.05 and 80 μm, on the basis of the precipitation conditions. In addition to these conditions, the presence or absence of a base during precipitation, influence the particle shape, which can vary from spherical to non-spherical but equitaxial.

Consequently the process of the present invention enables mixed zirconium and yttrium oxide powders, or equivalently zirconium oxide doped with yttrium, to be prepared by a simple and convenient reaction. The reagents used, and in particular the zirconium and yttrium acetates, are low-cost reagents. The precursor yield, i.e. the product obtained by precipitation, is high, being 85–100% calculated on the zirconium. The precipitation takes place advantageously at ambient temperature with a very short reaction time, and enables very high quantities of yttrium to be homogeneously incorporated into the precipitate, as stated. This precipitate transforms directly into the cubic crystal form of stabilized zirconium dioxide on calcining. The following experimental examples are given to better illustrate the present invention.

EXAMPLE 1

A single-phase mixture containing:

| 1) | freshly distilled acetonitrile | 690.6 g |
|---|---|---|
| 2) | 0.2 M aqueous sodium hydroxide | 33.3 g |
| 3) | 5 wt % zirconium acetate in water, filtered through a 0.2 μm membrane | 71.4 g |
| 4) | 5 wt % yttrium acetate in water, filtered through a 0.2 μm membrane | 71.4 g | is prepared in the following manner.

1) and 2) are fed in that order into a cylindrical reactor under slight stirring. A clear homogeneous solution is obtained, to which 3) and 4), premixed, are added from a dropping funnel. The mixture passes from clear to milky. The reaction is conducted for 33 minutes at 20° C. under stirring. A precipitate forms and is washed firstly with 95% ethanol and then with double distilled water. The washed precipitate is dried at 60° C. for 5 hours under vacuum to obtain 2.3669 g of a solid product. The weight loss on calcining at 1200° C. for 5 hours is 38.6%. Atomic absorption analysis on the calcined product shows 11.90 wt % of yttrium and 35.74 wt % of zirconium. The yield calculated on the initial zirconium is 87.1%. X-ray diffraction analysis confirms a cubic crystal structure after calcining. The calcined powder has a particle size of between 1 and 80 μm.

EXAMPLE 2

A water-in-oil emulsion containing:

| 1) | 1-octanol (Merck product) | 900.0 g |
|---|---|---|
| 2) | 0.2 M aqueous sodium hydroxide | 60.0 g |
| 3) | 5 wt % zirconium acetate in water, filtered through a 0.2 μm membrane | 15.2 g |
| 4) | 5 wt % yttrium acetate in water, filtered through a 0.2 μm membrane | 15.1 g | is prepared in the following manner.

1) and 2) are fed in that order into a cylindrical reactor under stirring, after which 3) and 4), premixed, are added from a dropping funnel, to produce a milky mixture. The reaction is conducted for 33 minutes at 20° C. under stirring. On termination of the reaction, the water separates to produce two phases. The aqueous phase contains the solid, which is separated and washed twice with 95% ethanol. The washed precipitate is dried at 60° C. for 5 hours under vacuum to obtain 1.0250 g of a solid product.

The weight loss on calcining at 900° C. for 5 hours is 35%. Atomic absorption analysis on the calcined product shows 20.39 wt % of yttrium and 28.85 wt % of zirconium. The yield calculated on the initial zirconium is 99%. X-ray diffraction analysis confirms a cubic crystal structure after calcining. The calcined powder has a particle size of between 1 and 20 μm.

EXAMPLE 3

A single-phase mixture containing:

| 1) | freshly distilled acetonitrile | 8515.0 g |
|---|---|---|
| 2) | 0.2 M aqueous sodium hydroxide | 492.5 g |
| 3) | 5 wt % zirconium acetate in water, filtered through a 0.2 μm membrane | 1428.2 g |
| 4) | 5 wt % yttrium acetate in water, filtered through a 0.2 μm membrane | 408.0 g | is prepared in the following manner.

1) and 2) are fed in that order into a cylindrical reactor under slight stirring. A clear homogeneous solution is obtained, to which 3) and 4), premixed, are added from a dropping funnel. The mixture passes from clear to milky. The reaction is conducted for 15 minutes at 20° C. under stirring. A precipitate forms and is washed with acetone alone during filtration. The washed precipitate is dried at 60° C. for 10 hours under vacuum to obtain 67.389 g of a crude product. The weight loss on calcining at 900° C. for 5 hours is 37.5%. Atomic absorption analysis on the calcined product shows 11.74 wt % of yttrium and 57.25 wt % of zirconium. The yield calculated on the initial zirconium is 97.3%. X-ray diffraction analysis confirms a cubic crystal structure after calcining. The powder has spherical morphology, this shape being maintained after calcining. The particle size varies from 0.05 to 2 μm.

EXAMPLE 4

A single-phase mixture containing:

| 1) | freshly distilled acetonitrile | 690.0 g |
|---|---|---|
| 2) | double distilled water | 84.6 g |
| 3) | 5 wt % zirconium acetate in water, filtered through a 0.2 μm membrane | 71.4 g |
| 4) | 5 wt % yttrium acetate in water, filtered through a 0.2 μm membrane | 20.1 g | is prepared in the following manner.

1) and 2) are fed in that order into a cylindrical reactor under stirring. A clear homogeneous solution is obtained, to which 3) and 4), premixed, are added over a period of 25 seconds from a dropping funnel. The mixture passes from clear to milky. The reaction is conducted for 33 minutes at 20° C. under stirring. A precipitate forms and is washed with acetonitrile and then with 95 vol % ethanol. The washed precipitate is dried at 60° C. for 5 hours under vacuum to obtain 3.2029 g of a crude product. The weight loss on calcining at 900° C. for 5 hours is 38.64%. Atomic absorption analysis on the calcined product shows 11.87 wt % of yttrium and 63.93 wt % of zirconium. The yield calculated on the initial zirconium is 98.3%. X-ray diffraction analysis confirms a cubic crystal structure after calcining. The powder has non-spherical but equitaxial morphology, is of extremely small particle size from 0.05 to 1.5 μm, and is partially aggregated.

EXAMPLE 5

A mixture containing:

| 1) | freshly distilled acetonitrile | 345.0 g |
|---|---|---|
| 2) | double distilled water | 84.6 g |
| 3) | 5 wt % zirconium acetate in water, filtered through a 0.2 μm membrane | 71.4 g |
| 4) | 5 wt % yttrium acetate in water, filtered through a 0.2 μm membrane | 20.1 g | is prepared in the following manner.

1) and 2) are fed in that order into a cylindrical reactor under stirring. A clear homogeneous solution is obtained, to which 3) and 4), premixed, are added from a dropping funnel. The mixture passes from clear to milky. The reaction is conducted for 33 minutes at 20° C. under stirring. A precipitate forms and is washed with acetonitrile and then with 95 vol % ethanol. The washed precipitate is dried at 60° C. for 5 hours under vacuum to obtain 3.0953 g of a crude product. The weight loss on calcining at 900° C. for 5 hours is 38.22%. Atomic absorption analysis on the calcined product shows 9.10 wt % of yttrium and 64.98 wt % of zirconium. The yield calculated on the initial zirconium is 99%. X-ray diffraction analysis confirms a cubic crystal structure after calcining. The powder has non-spherical but equiaxial morphology, is of extremely small particle size from 0.05 to 1.5 μm, and is partially aggregated.

EXAMPLE 6

A single-phased mixture is prepared, which consists of:

| | | |
|---|---|---|
| 1) | Acetonitrile (previously distilled) | 856.3 g |
| 2) | 0.5 N ammonium hydroxide soln. | 48.5 g |
| 3) | 5% wt zirconium acetate aq. soln. | 143.1 g |
| 4) | 5% wt yttrium acetate aq. soln. | 40.80 g |

A cylindrical reactor is charged with (1) and (2), in the order given, with gentle stirring. A clear homogeneous solution is obtained, to which the premixed (3) and (4) are added via a dropping funnel. Immediately, the solution passes from clear to milky. The reaction is continued 10 min at 20° C. with stirring. A precipitate is formed, which is collected on a 0.22 micrometer membrane and is washed with acetonitrile. Drying at 60° C. during 5 hour in a vacuum gives 6.724 g of a solid product. Calcination is carried out at 800° during 3 hours and gives 4.000 g of yttrium-stabilized zirconium dioxide. The Zr yield is 99%. The X-ray diffraction analysis confirms, after calcination, a crystalline cubic structure. The calcined powder is fine grained, nearly spherical, with a size of from 0.3 micrometer to 1 micrometer.

We claim:

1. A process for preparing mixed zirconium and yttrium oxides $ZrO_2(Y_2O_3)$ with a yttrium content, evaluated as metal, from about 15 to about 21% by weight, as powders in cubic crystal form, comprising:

mixing an aqueous solution of zirconium and yttrium carboxylates with an organic solvent chosen from aliphatic nitriles containing between 1 and 3 carbon atoms in the alkyl portion and aliphatic alcohols containing between 8 and 11 carbon atoms to form a mixture having between 70 and 90% by weight of organic solvent;

from said mixture, precipitating solid particles of mixed zirconium and yttrium oxides precursors by operating at a pH between 5 and 7 and at ambient or close to ambient temperature; and calcining said precipitated solid particles at temperatures between about 900° and 1400° C. to directly transform them from an amorphous state to a cubic crystal form.

2. The process as claimed in claim 1, wherein the yttrium and zirconium carboxylates are salts of lower aliphatic carboxylic acids and the organic solvents are chosen from acetonitrile and n-octanol.

3. The process as claimed in claim 1, wherein the mixture contains between 70 and 90% by weight of organic solvent and between 8 and 30% by weight of water, said aqueous solution containing between 5 and 10% by weight of yttrium and zirconium carboxylates in a molar ratio of between 0.6:1 and 2:1, the precipitation being effected at a temperature between about 18° C. and about 25° C., while maintaining the mixture under stirring for a time of 1-60 minutes.

4. The process as claimed in claim 1, wherein the pH of the aqueous zirconium and yttrium carboxylate solution is adjusted to between 5 and 7 by adding an alkaline metal hydroxide in a quantity of between 0 to $6 \times 10^{-3}$ moles per 1000 g of mixture.

5. The process as claimed in claim 1, wherein the calcining is effected at a temperature of between about 900° and 1400° C. for a time of 1-10 hours.

6. The process as claimed in claim 2 wherein said yttrium and zirconium salts of lower aliphatic carboxylic acids are yttrium and zirconium acetates.

7. The process as claimed in claim 3 wherein said molar ratio is between 0.8:1 and 1.3:1.

8. The process as claimed in claim 4 wherein said alkaline metal hydroxide is sodium hydroxide.

9. The process as claimed in claim 1 wherein the pH of the aqueous zirconium and yttrium carboxylate solution is corrected by adding ammonia or an aliphatic amine in an amount of between 0 and 0.4 moles per 1000 g of mixture.

10. The process as claimed in claim 9 wherein said aliphatic amine is butylamine.

* * * * *